United States Patent [19]

Fontana et al.

[11] Patent Number: 4,500,674

[45] Date of Patent: Feb. 19, 1985

[54] HIGH TEMPERATURE POLYMER CONCRETE COMPOSITIONS

[75] Inventors: Jack J. Fontana; Walter Reams, both of Shirley, N.Y.

[73] Assignee: The United States of America as represented by the United States Department of Energy, Washington, D.C.

[21] Appl. No.: 614,508

[22] Filed: May 29, 1984

[51] Int. Cl.³ .......................... C04B 7/02; C08K 3/34
[52] U.S. Cl. ...................................... 524/650; 106/90; 106/98
[58] Field of Search ................... 106/90, 98; 524/650, 524/4, 5

[56] References Cited

U.S. PATENT DOCUMENTS

| | | | |
|---|---|---|---|
| 3,181,610 | 5/1965 | Wiley | 106/90 |
| 3,190,762 | 6/1965 | Carlson et al. | 106/90 |
| 4,126,009 | 11/1978 | Tomic | 106/90 |
| 4,126,480 | 11/1978 | MacWilliams et al. | 106/100 |
| 4,231,917 | 11/1980 | Zeldin et al. | 524/650 |
| 4,402,752 | 9/1983 | Chesney | 106/98 |

Primary Examiner—Howard S. Williams
Attorney, Agent, or Firm—James W. Weinberger; Margaret C. Bogosian

[57] ABSTRACT

This invention is concerned with a polymer concrete composition, which is a two-component composition useful with many bases including metal. Component A, the aggregate composition, is broadly composed of silica, silica flour, portland cement, and acrylamide, whereas Component B, which is primarily vinyl and acrylyl reactive monomers, is a liquid system. A preferred formulation emphasizing the major necessary components is as follows:

| Component A: | | |
|---|---|---|
| Silica sand | 60–77 | wt. % |
| Silica flour | 5–10 | wt. % |
| Portland cement | 15–25 | wt. % |
| Acrylamide | 1–5 | wt. % |
| Component B: | | |
| Styrene | 50–60 | wt. % |
| Trimethylolpropane trimethacrylate | 35–40 | wt. % | and necessary initiators, accelerators, and surfactants.

5 Claims, No Drawings

HIGH TEMPERATURE POLYMER CONCRETE COMPOSITIONS

BACKGROUND AND GENERAL DESCRIPTION

The invention described herein was made or conceived in the course of, or under contract with, the United States Department of Energy.

The present invention is concerned with a polymer concrete composition, which is a two-component composition useful with many bases including metal. Component A, the aggregate composition, is broadly composed of silica, silica flour, portland cement, and acrylamide, whereas Component B, which is primarily vinyl and acrylyl reactive monomers, is a liquid system. A preferred formulation emphasizing the major necessary components is as follows:

| Component A: | | |
|---|---|---|
| Silica sand | 60–77 | wt. % |
| Silica flour | 5–10 | wt. % |
| Portland cement | 15–25 | wt. % |
| Acrylamide | 1–5 | wt. % |
| Component B: | | |
| Styrene | 50–60 | wt. % |
| Trimethylolpropane trimethacrylate | 35–40 | wt. % | and necessary initiators, accelerators, and surfactants. Component A and Component B are mixed in use. Below are given two formulae, a broad formula and a narrow formula, which concern this invention. The range of the broad composition is:

| Component A | Aggregate System Wt. % (about) |
|---|---|
| Blended silica sands | 60–77 |
| Silica flour | 5–10 |
| Portland Cement | 15–25 |
| Acrylamide | 1.5–2 |
| Non-ionic wetting agent | .2–.3 |
| Silane crosslinker | .2–.3 |
| Alkyl methacrylate copolymer | 1–1.7 |
| Peroxide initiator (low temperature) | .1–.7 |

| Component B | Monomer System Wt. % (about) |
|---|---|
| Styrene monomer | 50–60 |
| Polystyrene | 3–5 |
| Trimethylolpropane trimethacrylate (TMPTMA) | 35–40 |
| Silane crosslinker | .6–1.4 |
| Non-ionic wetting agent | .6–1.4 |
| Dimethyl aniline | .6–1.4 |
| Peroxide (high temperature) | .2–.8 |

The specific percentages by weight of the composition are:

| Component A | Aggregate System Wt. % (about) |
|---|---|
| Blended silica sands | 66 |
| Silica flour | 6 |
| Portland Cement | 24 |
| Acrylamide | 1.5 |
| Non-ionic wetting agent | 0.25 |
| Silane crosslinker | 0.25 |

| Component A | Aggregate System Wt. % (about) |
|---|---|
| Ethyl methacrylate/methyl methacrylate copolymer | 1.5 |
| Peroxide initiator (benzoyl) | 0.5 |

| Component B | Monomer System Wt. % (about) |
|---|---|
| Styrene monomer | 53.6 |
| Polystyrene | 4.3 |
| Trimethylolpropane trimethacrylate | 38.6 |
| Silane crosslinker | 1.0 |
| Non-ionic wetting agent | 1.0 |
| Dimethyl aniline | 1.0 |
| Peroxide (di-tertiary-butyl) | 0.5 |

The weight percentages between Component A and Component B, of course, are regulated by the amount of plastic that is desired in the concrete. The inventors have found that a ratio of about 1:6 of polymer to concrete in weight percentage is preferred but other variations are possible, depending upon the final use of the polymer concrete, as, for example, road beds which stand a lot of use and many times could have more large aggregate and the ratio could drop to close to 1:10. Specific preferred compositions are in the range of 85–90 to 10–15 aggregate to monomer.

This invention relates to high temperature polymer concrete compositions having thermal stability and which are operational at temperatures up to 260° C.

These polymer concrete composites consist of an inert inorganic filler and organic binder. They have special use as building materials and for the repair of deteriorated concrete. In the past there has been used organosiloxane copolymer as a binder for concrete filler, but difficulties incurred due to the fact that there was a relatively long curing time with these compositions.

Component A

Component A, the aggregate composition, in this invention is utilized in a weight percent of 85–90% weight of the entire composition.

Blended silica sands. Silica is a blend of silica sands (60–70%) and silica flour (5–10%). The small particles in the silica flour serve as nucleating agents for the unsaturates, which are added from the other component.

Portland cement. Portland cement is present in about 15–25% of the solid Component A. Portland cement III is preferred but any of the various types of portland cement will be satisfactory. See Table I below.

Acrylamide. Acrylamide is present as a monomer solid and it is quite important as a reactive unsaturate which condenses through the carbonyl or react through the double bond. This material is classified as important to the success of the cement. Acrylamide is used in this composition to replace a suspected carcinogenic material which had been used in the past; i.e., acrylonitrile. Acrylamide does not react until the temperature is above 84.5° C. It is quite important in the composition because the other unsaturates will react with acrylamide preferentially to reacting with the other monomers. It comprises 1–5% of the solid component (A).

TABLE I

Chemical Composition of Some Typical Cements, %

| Type | SiO$_2$ | Al$_2$O$_3$ | Fe$_2$O$_3$ | CaO | MgO | SO$_3$ | Loss | Insoluble Residue |
|---|---|---|---|---|---|---|---|---|
| Type I | 20.9 | 5.2 | 2.3 | 64.0 | 2.8 | 2.9 | 1.0 | 0.2 |
| Type II | 21.7 | 4.7 | 3.6 | 63.6 | 2.9 | 2.4 | 0.8 | 0.4 |
| Type III | 21.3 | 5.1 | 2.3 | 64.9 | 3.0 | 3.1 | 0.8 | 0.2 |
| Type IV | 24.3 | 4.3 | 4.1 | 62.3 | 1.8 | 1.9 | 0.9 | 0.2 |
| Type V | 25.0 | 3.4 | 2.8 | 64.4 | 1.9 | 1.6 | 0.9 | 0.2 |
| white | 24.5 | 5.9 | 0.6 | 65.0 | 1.1 | 1.8 | 0.9 | 0.2 |
| alumina | 5.3 | 39.8 | 14.6 | 33.5 | 1.3 | 0.4 | 0 | 4.8 |

Non-ionic wetting agent. A non-ionic wetting agent should be present in the percentages 0.2–0.3. The wetting agent has wet out properties which reduce the surface tension of the polymer. In the narrow formula a non-ionic wetting agent is S-440, ethoxylated-betatetramethyldecynediol. Such wetting agents may be ethylene oxide condensates, propylene oxide condensates, and like materials.

Alkyl methacrylate copolymer. The alkyl methacrylate copolymer is used as a thickening agent and causes a film to form; when the material is passed through it, it reduces vapor pressure. A preferred copolymer is ethyl methacrylate resin, which is a copolymer of ethyl methacrylate/methyl methacrylate (50/50) (Elvacite 2042, 2043-DuPont). A table showing alternative lower alkyl methacrylate resins is set out below in Table II.

Peroxide initiator. Benzoyl peroxide is preferred but other peroxide initiators which satisfy low temperature operating requirements; i.e., about room temperature, may be utilized.

In the presence of the dual peroxide initiator, the high temperature peroxide (the di-tertiary-butyl with the monomers) and the low temperature benzoyl type peroxide initiator with the aggregate, it should be understood that this concrete system operates with the peroxide as a double curing system; the benzoyl peroxide is a low temperature catalyst useful at room temperatures and the di-tertiary-butyl peroxide is a high temperature catalyst. This means that in use, as for example a liner on a steel pipe, as hot fluids pass through the pipe, the composition continues to cure, thus the high temperature di-tertiary-butyl peroxide is not activated until the temperature of the system is about 115° C. Sometimes the materials are used as precast products and that would be a post-cure or double cure. As applied in the field, when these compositions are used where high temperature fluids pass through, the di-tertiary-butyl peroxide continues the reaction to give it a final cure. As substitutes for the designated peroxides, alkyl peroxide such as methyl and propyl may be used for the stated butyl peroxide and aromatic peroxides may be utilized for benzoyl peroxide.

TABLE II

| Elvacite ® Grade | Typical Inherent Viscosity* |
|---|---|
| Methyl Methacrylate Resins | |
| 2008 | 0.18 |
| 2009 | 0.39 |
| 2010 | 0.39 |
| 2021 | 0.49 |
| 2041 | 1.25 |
| Methacrylate Copolymer Resins | |
| 2013 | 0.16 |
| 2014 | 0.40 |
| 2028 | 0.24 |
| Ethyl Methacrylate Resins | |
| 2042 | 0.83 |
| 2043 | 0.20 |
| Buthyl Methacrylate Resins | |
| 2044 | 0.51 |
| 2045 | 0.63 |
| 2046 | 0.53 |

*Inherent viscosity of a solution containing 0.25 g polymer in 50 ml. methylene chloride measured at 20° C. using a No. 50 Cannon-Franske viscometer.

Component B

This monomer is present in an amount of 10–15% by weight of the total composition.

Styrene monomer. The styrene monomer is most important since it is present in 50–60% of Component B.

Polystyrene. This material is utilized in a weight percent of 3–5. The purpose of the polystyrene is to act as a thickening agent with the styrene because the styrene itself has a very large shrinkage and this is used as an anti-shrink, or thickening, agent.

Trimethylolpropane trimethacrylate (TMPTMA). This compound is present in 35–40% by weight of the monomer system, Component B, and is primarily a crosslinking agent.

Non-ionic wetting agent. The non-ionic wetting agent present in Component B may be similar to that in Component A.

Dimethyl aniline. Dimethyl aniline is used as an accelerator to make the reaction start at room temperature, and there may be utilized diethyl aniline or dimethyl-p-toluidine as alternatives to the preferred dimethyl aniline.

Peroxide. The peroxide in this case is a high-temperature peroxide, preferably di-tertiary-butyl, which does not start activating until the temperature of the system is about 115° C. The action of the peroxide is discussed ante with the low temperature peroxide.

Organo functional silanes

It is noted above that silane crosslinker appears in both Component A, the aggregate, and Component B. the unsaturated monomer. Crosslinking agents are selected from a group of silanes called organo functional silanes typified by A174 (Union Carbide). The compound is unsaturated and contain a double bond through the acrylic. A174 is gamma-methacryloxypropyltrimethoxysilane. These particular silanes are preferred because the basic thing that they do is react both as a silane and as an organic molecule. The preferred A174 can be viewed as methacryloxy subsituted silanes, and these organofunctional silanes are used in small amounts. The uniqueness of these products is that these particular silanes are generally considered coupling agents. The organics and the SiO bond to one side and the composition bonds to the organics on the other side. It thus gives better bond to the silica sand over other types of materials.

More specifically, the organosiloxane contains an organic functional pendant group selected from the group consisting of $CH_3$, $CH=CH_2$, $C_2H_5$ of $C_6H_5$, which allows for crosslinking with the olefinically unsaturated monomers, the amount of crosslinking monomer being in the aggregate Component A 0.2–0.3% of A and in the monomer Component B at 0.6–1.4% of B.

Reaction of the Unsaturates

The instant invention relates to a high temperature polymer cement composition comprising about 10-15% by weight of a liquid monomer mixture consisting essentially of an organosiloxane polymer crosslinked with an olefinically unsaturated monomer selected from the group consisting of styrene, ethyl methacrylate copolymer resin, trimethylolpropane trimethacrylate, and mixtures thereof; and about 85-90% by weight of an inert inorganic filler system containing silica sand, silica flour, portland cement, and mixtures thereof; and a free radical initiator such as benzoyl peroxide to initiate crosspolymerization of the monomer mixture in the presence of the inorganic filler mixed at low temperatures and a high temperature free radical initiator such as di-tertiary-butyl peroxide. In use as a pipe coating, this polymer cement will be subjected to high temperatures above 115° C. and the reactive components in the coating on the pipe will engender a dual or second cure.

Temperature Resistance

It has been found that the high temperature polymer cement formulations of the instant invention containing an organosiloxane copolymer as a binder for a concrete filler are thermally stable at 175° C., and samples exposed in an autoclave for 30 days to 25% brine at 175° C. did not deteriorate.

Definitions

In this specification and claims with reference to the peroxide initiator, low temperature means room temperature and up to 115° C. High temperature is 115° C. and up.

Both low temperature and high temperature peroxides may be selected from those utilized, such as di-tertiary-butyl peroxide, benzoyl peroxide, lauryl peroxide, and other organic peroxides.

It is realized that the major components, such as set out in claim 1, are the most important as to result and defining the invention and the necessary initiators, accelerators, and surfactants can be varied within wide ranges. Of special importance to the present invention is the presence of a dual peroxide initiator operable at room temperature on one side and above 115° C. on the other.

EXAMPLE 1

| Component A | Aggregate System Wt. % |
|---|---|
| Blended silica sands | 66 |
| Silica flour | 6 |
| Portland Cement | 24 |
| Acrylamide | 1.5 |
| Ethoxylated tetramethyldecynediol | 0.25 |
| Gamma-methacryloxypropyl-trimethoxysilane | 0.25 |
| Ethyl methacrylate/methyl methacrylate copolymer (Elvacite 2042, DuPont) | 1.5 |
| Benzoyl peroxide (BFF-50, Noury Chemical, Burt, NY) | 0.5 |

| Component B | Monomer System Wt. % |
|---|---|
| Styrene monomer | 53.6 |
| Polystyrene | 4.3 |
| Trimethylolpropane trimethacrylate | 38.6 |
| Silane crosslinker | 1.0 |
| Non-ionic wetting agent | 1.0 |
| Dimethyl aniline | 1.0 |
| Benzoyl peroxide (BFF-50, Noury Chemical, Burt, NY) | 0.5 |

EXAMPLE 2

Saturated monomer compositions of Example 1 was added to or poured on the aggregates of Component A. In the aggregate system, wetting agents such as Surfynol-440 (ethoxylated tetramethyl decynediol) were added to the dry mix in low concentrations. The silane bonding agent, which was gamma-methacryloxypropyltrimethoxysilane, was used to enhance the bonding of the monomer to the silica surface.

The above components were combined in a ratio of 85-90% by weight of A, with 10-15% by weight of B. In about 60-120 minutes a fast setting, durable, high strength, corrosion resistant polymer concrete was formed at room temperature.

EXAMPLE 3

In testing concrete of Examples 1 and 2, several runs were made on the test for compression strength at various temperatures over a period of days in an autoclave. It was found that the concrete had satisfactory to good compression strength where the test temperature was up to 175 and where the testing was in an autoclave in a 25% brine for up to 120 days.

TABLE III

| Geothermal Polymer Concrete | | |
|---|---|---|
| Avg. Compression Strength, psi | Test Temp. 0° | Time in Autoclave at 175° C., 25% Brine, Days |
| 18,262 | 20 | 0 |
| 12,007 | 100 | 0 |
| 8,648 | 150 | 0 |
| 7,229 | 170 | 0 |
| 7,599 | 175 | 30 |
| 8,228 | 175 | 60 |
| 9,194 | 175 | 120 |

We claim:

1. A composition for preparing a polymer concrete consisting of two components, (a) Component A, the aggregate, consisting essentially of silica sand, silica flour, and portland cement in the following concentrations:

| Silica sand | 60-77 | wt. % |
|---|---|---|
| Silica flour | 5-10 | wt. % |
| Portland cement | 15-20 | wt. % |
| Acrylamide | 1-5 | wt. % | and (b) Component B, the monomer system, consisting essentially of styrene and trimethylolpropane trimethacrylate in the following concentrations:

| Styrene | 50-60 wt. % |
|---|---|
| Trimethylolpropane trimethacrylate | 35-40 wt. % | and necessary initiators, accelerators, and surfactants.

2. A composition for preparing a thermally stable non-corrosive concrete of high compressive strength comprising a dual component system wherein Component A, the aggregate, contains silica sand, silica flour, and portland cement in about 85-90% by weight, and Component B, reactive monomer system, contains styrene, trimethylolpropane trimethacrylate, and acrylamide in about 10-15% by weight, further containing a low temperature peroxide initiator in the aggregate system and a high temperature peroxide in the monomer system.

3. The composition according to claim 2 wherein the low temperature peroxide initiator is benzoyl peroxide and the high temperature peroxide initiator is tertiary butyl peroxide.

4. A composition for preparing a polymer concrete designed in a two-component system, as follows:

| Component A (85-90%) | Aggregate System Wt. % (about) |
|---|---|
| Blended silica sands | 60-77 |
| Silica flour | 5-10 |
| Portland cement | 15-25 |
| Acrylamide | 1.5-2 |
| Non-ionic wetting agent | .2-.3 |
| Silane crosslinker | .2-.3 |
| Alkyl methacrylate copolymer | 1-1.7 |
| Low temperature peroxide initiator | .1-.7 |

| Component B (10-15%) | Monomer System Wt. % (about) |
|---|---|
| Styrene Monomer | 50-60 |
| Polystyrene | 3-5 |
| Trimethylolpropane trimethacrylate | 35-40 |
| Silane crosslinker | .6-1.4 |
| Non-ionic wetting agent | .6-1.4 |
| Alkyl substituted aniline | .6-1.4 |
| High temperature peroxide initiator | .2-.8 |

5. A composition for preparing a polymer concrete designed in a two-component system, as follows:

| Component A (85-90%) | Aggregate System Wt. % (about) |
|---|---|
| Blended silica sands | 66 |
| Silica flour | 6 |
| Portland Cement | 24 |
| Acrylamide | 1.5 |
| Non-ionic wetting agent | 0.25 |
| Silane crosslinker | 0.25 |
| Ethyl methacrylate/methyl methacrylate copolymer | 1.5 |
| Low temperature benzoyl peroxide | 0.5 |

| Compound B (10-15%) | Monomer System Wt. % (about) |
|---|---|
| Styrene monomer | 53.6 |
| Polystyrene | 4.3 |
| Trimethylolpropane trimethacrylate | 38.6 |
| Silane crosslinker | 1.0 |
| Non-ionic wetting agent | 1.0 |
| Dimethyl aniline | 1.0 |
| High temperature di-tertiary-butyl peroxide | 0.5 |

* * * * *